March 18, 1958  A. A. WAGNER ET AL  2,827,183
TRACTOR ATTACHMENT BOOM WITH LATERALLY SWINGABLE END PORTION
Filed Jan. 19, 1954  5 Sheets-Sheet 1

INVENTORS
ADOLPH A. WAGNER
ARNOLD J. WERNER
BY
Wheeler, Wheeler & Wheeler
ATTORNEYS

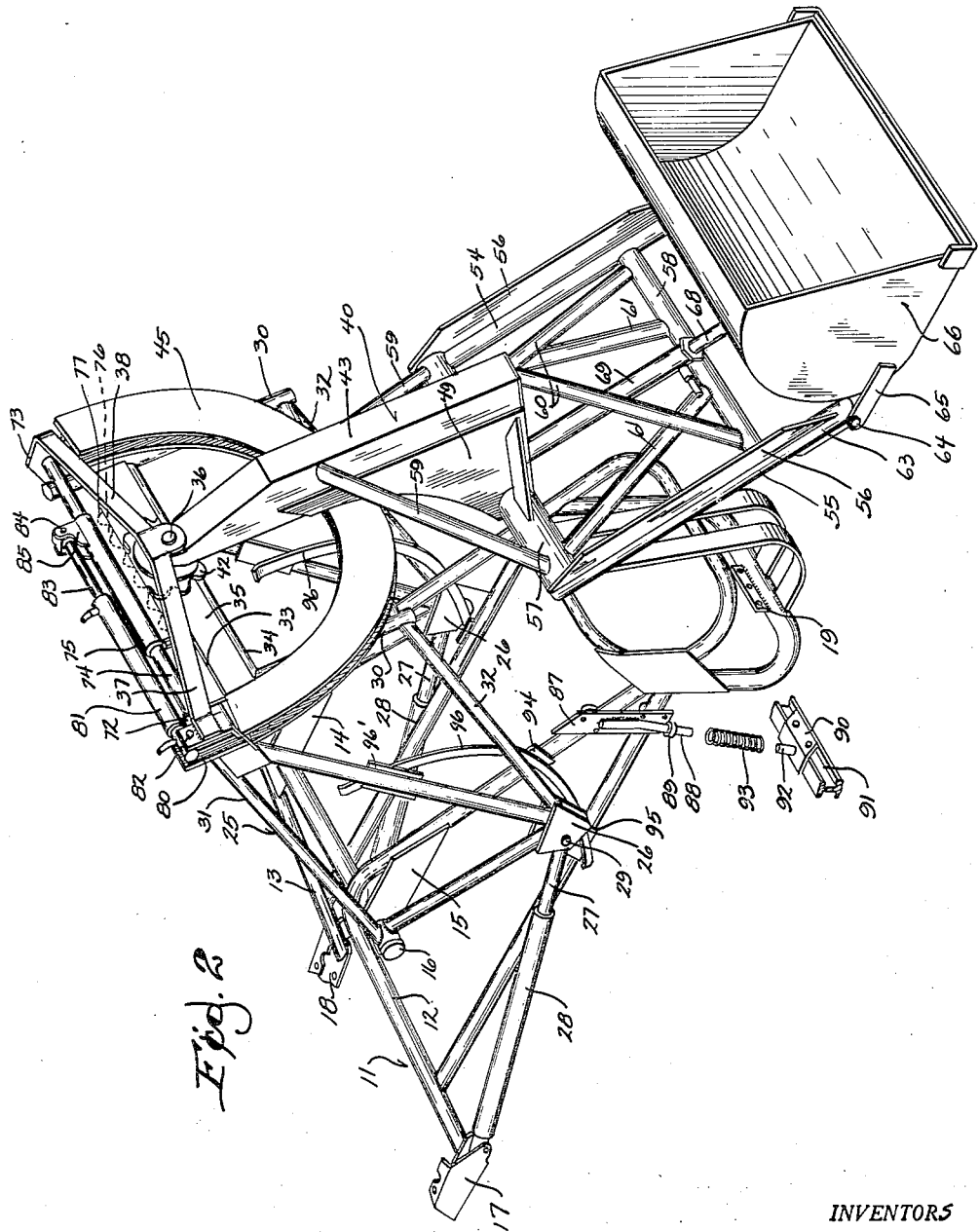

March 18, 1958   A. A. WAGNER ET AL   2,827,183
TRACTOR ATTACHMENT BOOM WITH LATERALLY SWINGABLE END PORTION
Filed Jan. 19, 1954   5 Sheets-Sheet 3
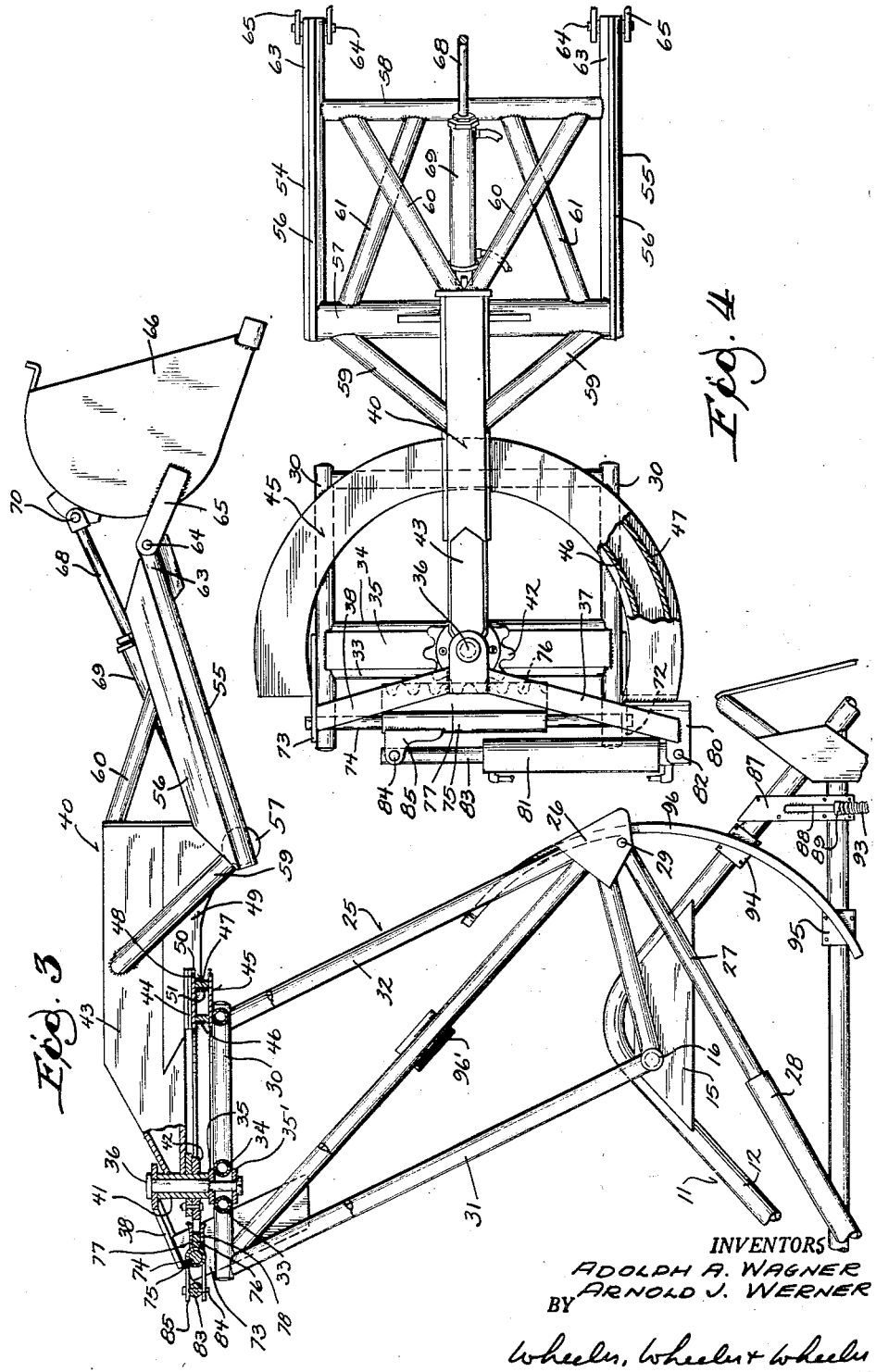
INVENTORS
ADOLPH A. WAGNER
ARNOLD J. WERNER
BY Wheeler, Wheeler & Wheeler
ATTORNEYS

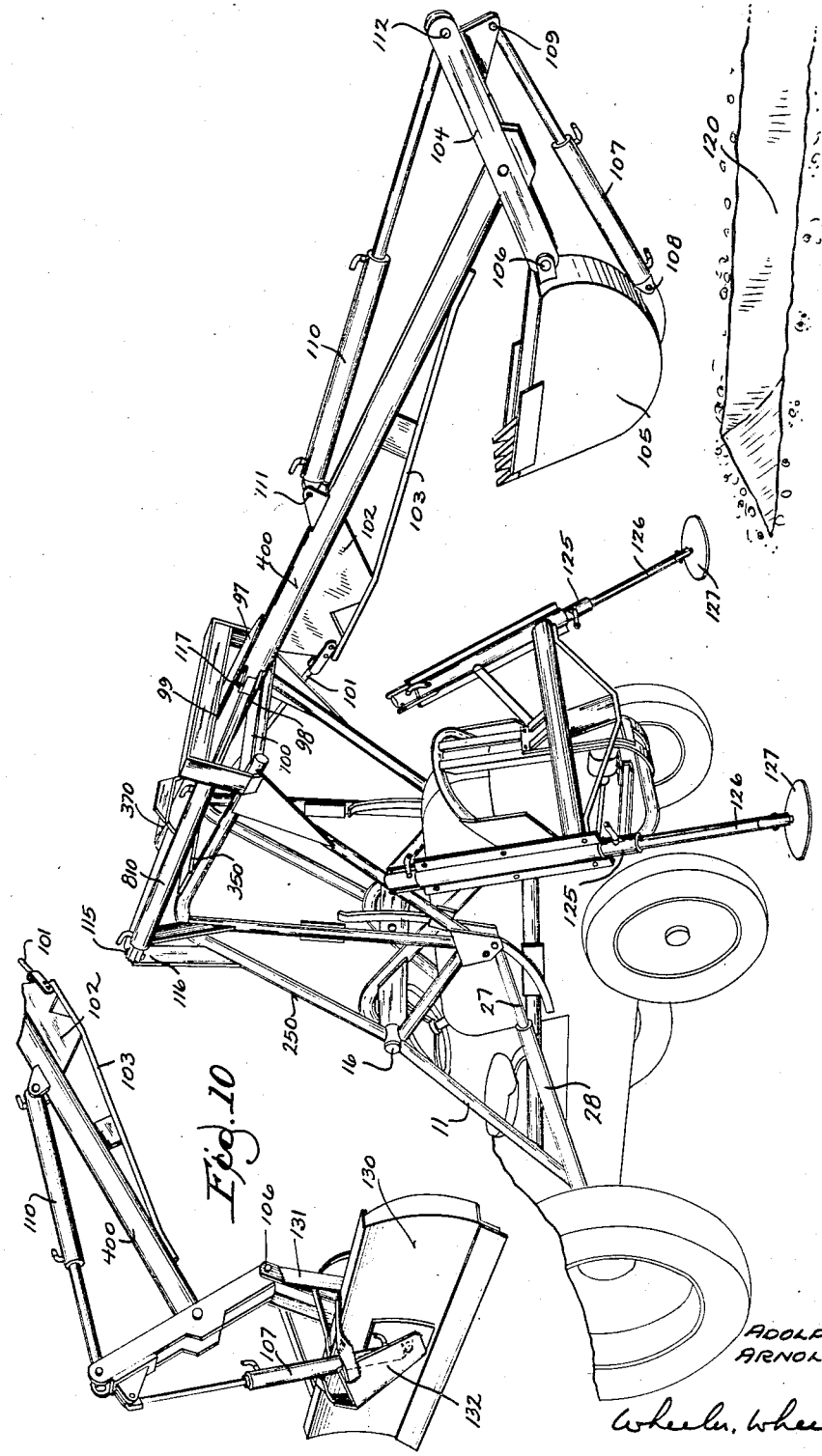

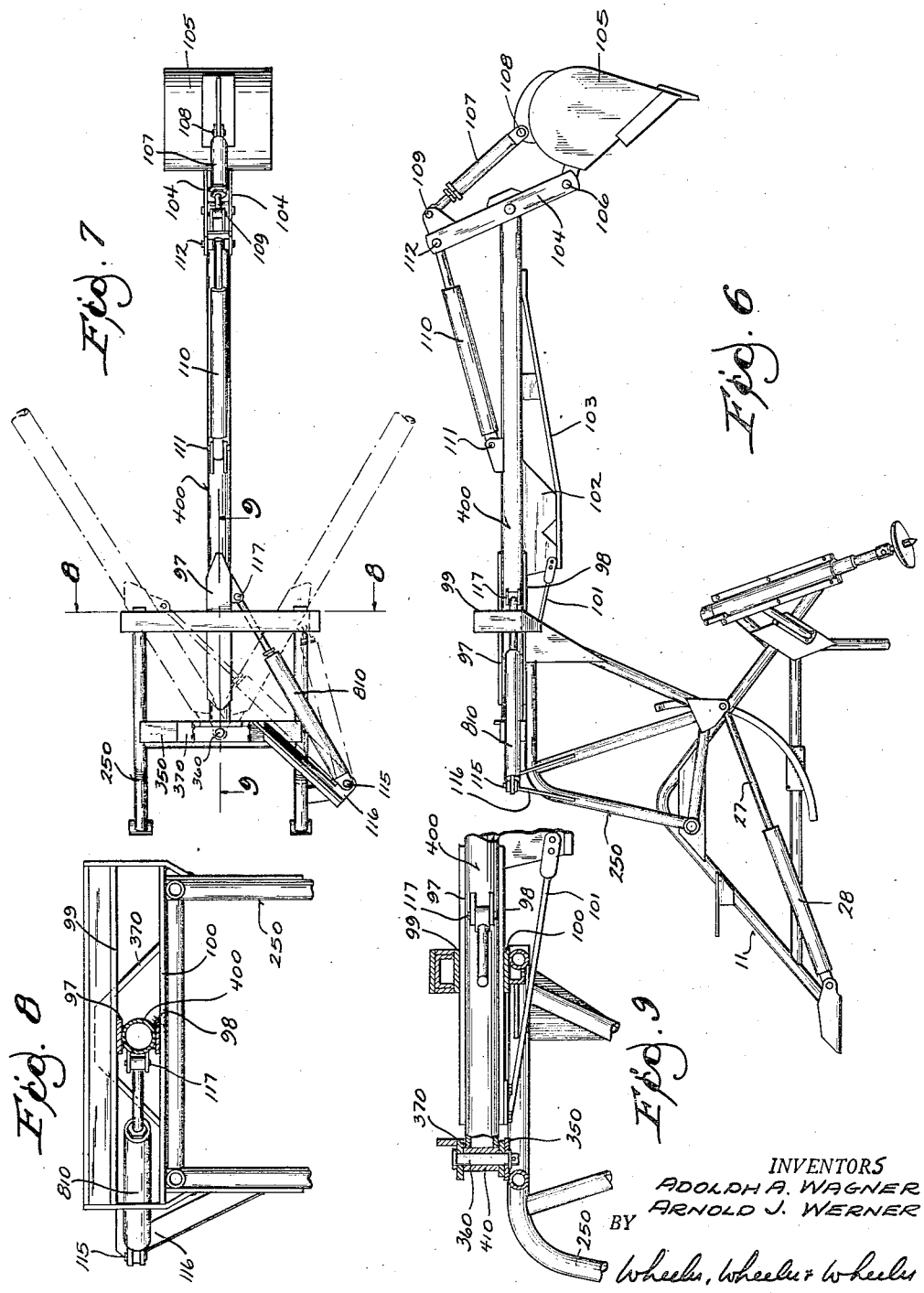

United States Patent Office 2,827,183
Patented Mar. 18, 1958

2,827,183

TRACTOR ATTACHMENT BOOM WITH LATERALLY SWINGABLE END PORTION

Adolph A. Wagner, Milwaukee, and Arnold J. Werner, Elm Grove, Wis., assignors to Wagner Iron Works, Milwaukee, Wis., a corporation of Wisconsin Application January 19, 1954, Serial No. 404,998

20 Claims. (Cl. 214—132)

This invention relates to a tractor attachment having a vertically swingable boom with laterally swingable implement carrying end portion.

For a considerable period of years, there has been widely prevalent use of tractor attachments of a type in which a frame is demountably applied to an otherwise conventional tractor to provide the fulcrum points near the rear of the tractor for a boom which projects forwardly to carry an implement such as a scraper or bucket or lift fork which the operator can control concurrently with his control of the tractor, and which is disposed forwardly of the tractor where he can accurately guide its movements without glancing away from the path of advance of the tractor.

In the devices of this character known to the prior art, it has been necessary for the operator to exert great dexterity in manipulating forward and backward and turning movements of the tractor so that workpieces or material picked up directly in front of the tractor can be discharged onto a pile or a waiting truck laterally of the tractor path by bodily turning the tractor. The present invention seeks to eliminate much of the necessity for bodily movement of the tractor during the use of an attachment of this kind. In so doing, we seek to save the tremendous expense occasioned by wear and tear on the tractor tires as a result of nearly continuous tractor movement in guiding the tool or work support from the point of work engagement to the point of work delivery.

To this end, we have modified the tractor boom so that the portion of the boom which swings vertically in general accord with conventional practice is now provided with a turntable or equivalent device disposed at a right angle or at an oblique angle with respect to the longitudinal axis of the vertically swinging base of the boom. On this turntable, we mount a boom extension which, by reason of the angular disposition of the turntable, projects at right angles or obliquely with respect to the base portion of the boom and is freely swingable laterally on the turntable or king pin about an axis which is or may be nearly aligned with the longitudinal axis of the base portion of the boom. By reason of the angle between the base portion of the boom and the laterally swingable extension thereof, the implement or tool carried at the free end of the extension can be moved to a point at or near ground level immediately ahead of the front wheels of the tractor and, having picked up its load at that point, the boom as a whole may be swung vertically upwardly. Thereupon, with the load at the desired level, the extension may be swung laterally to deliver the load onto a pile or into a waiting truck, as the case may be.

In one exemplification here selected to illustrate the uses of the invention, the attachment is provided with a dump bucket at the end of the laterally swingable boom extension. In another embodiment, I have shown the device adapted for use as a trencher and in still another embodiment I have shown it equipped with a back-fill blade.

In the drawings:

Fig. 2 is a view in perspective of the tractor attachment shown in Fig. 1 as it appears when detached from the tractor, portions of the front tractor axle being illustrated fragmentarily.

Fig. 3 is a fragmentary detailed view in side elevation of the tractor attachment in Figs. 1 and 2 showing the boom oscillated to its maximum elevation.

Fig. 4 is a plan view of the fragmentarily illustrating parts shown in Fig. 3.

Fig. 5 is a view in perspective fragmentarily illustrating a trencher embodiment of the invention.

Fig. 6 is a view in side elevation of the trencher embodiment as it appears when removed from the tractor.

Fig. 7 is a plan view of the trencher boom shown in Fig. 6.

Fig. 8 is a view taken in transverse section on the line 8—8 of Fig. 7.

Fig. 9 is a view taken in longitudinal section on the line 9—9 of Fig. 7.

Fig. 10 is a fragmentary detailed view in perspective of the trencher embodiment as it appears with the trenching shovel removed and a back-fill blade substituted.

Figure 1:
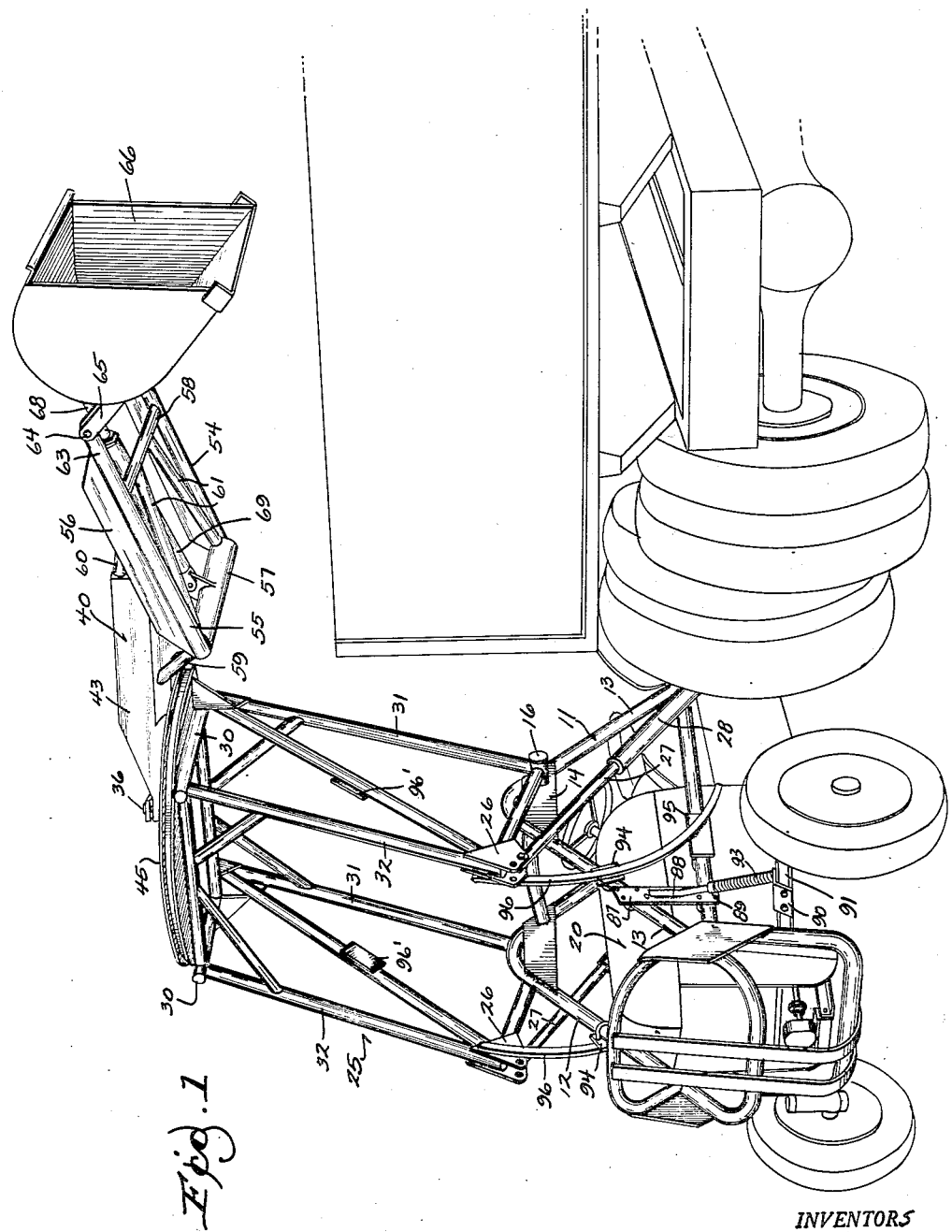
Fig. 1 is a view fragmentarily illustrating in perspective a tractor attachment embodying our invention as it appears in position for discharging its load into a waiting truck.

The mounting frame generically designated by reference character 11 is of the general type described in our application Serial No. 219,968, filed April 9, 1951, and entitled "Tractor Base Frame and Dipper Stick Mounting," and is now abandoned. It comprises a pair of cross connected side frames 12 and 13, each being of the general order of an A-frame with a rounded top below which gussets 14, 15 support pintle means at 16 upon which there is pivoted the base section of the boom hereinafter to be described.

The mounting frame 11 has pads at its rear end at 17, 18 for connection with the tractor rear axle and it has at its forward end a plate 19 which is bolted to the front of the tractor 20 to provide a third point of support.

The base section of the boom is generically designated by reference character 25. It has substantially the form of a parallelogram in side elevation, as best shown in Fig. 2 and Fig. 3. Its two sides are pivoted at corresponding rear upper corners on the pintle means 16 of the mounting frame and their normally lower rear corners are provided with gusset plates 26 to which the pistons 27 of the hydraulic rams 28 are pivoted at 29. The ram cylinders are pivoted to the rear axle mounting pads 17 and 18 above described. The pistons are movable in the cylinders to oscillate the base section 25 of the boom between the lowered position of the parts shown in Fig. 2 and the elevated position of the parts shown in Fig. 3.

The bars 30 at the end of the boom base section 25 are not at right angles to its longitudinal bars 31 and 32 but are disposed at an oblique angle as best shown in Fig. 3. The cross members 33, 34 which extend transversely of the end of the base section 25 have bed plates 35, 35' welded to their opposite faces to support a king pin 36, the outer end of which is braced by straps 37, 38. While the precise angle between the king pin 36 and the axis of the base section 25 of the boom is not critical, it is preferred that the pin, instead of being aligned with or parallel with the longitudinal axis of the boom base section 25, should be inclined slightly in a downward direction as viewed in Fig. 2 so that, with the longitudinal axis of base section 25 inclined slightly upwardly, the longitudinal axis of the king pin 36 is approximately horizontal. When the base section 25 is oscillated to the elevated position in which it is shown in Fig. 3, the king pin is substantially vertical and the longitudinal axis of the base section 25 is inclined somewhat toward the rear of the tractor.

Pivoted on the king pin 36 is the laterally swingable forward boom extension generically designated by reference character 40. The precise construction is not important but that illustrated has been found to be practicable. The extension has a bearing sleeve 41 oscillatable on the king pin 36 and provided with a toothed control segment 42. (Fig. 4). Rigidly welded to the sleeve 41 and segment 42 is a box beam 43, provided on its under or rear side with a bearing plate 44 which rides upon a turntable sector 45 which, for strength, desirably is also of rectangular cross section having concentric side walls 46 and 47 and a top wall having an overhanging flange 48 as best shown in Figs. 3 and 4. A web 49 which reinforces the box beam 43, is notched at 50 to receive the flange 48 and has an integral tongue 51 which underlies the flange to hold the boom extension 40 to the turntable 45.

The free end of the laterally swingable boom extension 40 may conveniently be made like the forward end of any conventional boom of an attachment of this kind. Accordingly, it is shown in Fig. 3 and Fig. 4 to comprise side members 54, 55 re-inforced by vertical webs 56 and cross connected by transverse members 57 and 58. Member 57 passes beneath the box beam 43 and is welded thereto and fixed by braces 59. The forward transverse member 58 is connected to the box beam by diagonal braces 60 and has its intermediate portion connected to the ends of the rear cross member 57 by means of braces 61.

The lateral members 54, 55 at the free end of the boom extension project forwardly at 63 and are provided with pintles 64 as shown in Fig. 3 and Fig. 4 to receive the arms 65 which carry the scoop or bucket 66. The bucket is actuated through its range by oscillation by the piston 68 of a ram cylinder 69 pivoted to the implement at 70.

Fluid pressure is used to oscillate the boom extension from side to side. The side bars at the outer end 30 of the base portion 25 of the boom carry plates 72, 73 shown in Figs. 2, 3 and 4. Between these plates extends a guide rod 74 on which there is reciprocable a tube 75 carrying rack 76 confined between upper and lower guide plates 77, 78. The segment 42 on the bearing sleeve 41 of the boom extension projects between the guide plates 77, 78 into mesh with the teeth of rack 76 to receive oscillatory motion from the rack in the course of rack reciprocation along the guide rod 74.

The bracket 80 has the cylinder 81 of a hydraulic ram pivoted to it at 82. The piston 83 of the ram has a pivotal connection at 84 between ears 85 which project laterally from the sleeve 75 as best shown in Figs. 2, 3 and 4. Fluid admitted to one end or the other of the cylinder 81 will cause the piston 83 to reciprocate through a range which extends in both directions from a central position in which the parts are shown in Figs. 2 and 4. Accordingly, in any position of elevation of the base portion 25 of the boom, the boom extension may be swung laterally. With the boom base elevated, as shown in Fig. 3, the king pin 36 is nearly vertical and the boom extension 40 is nearly horizontal. Thus a load in the bucket or other implement at the free end of the laterally swingable forward boom extension 40 may be swung either to the right or left of the discharge. At its maximum elevation it is readily able to clear the side of a truck.

In order to maintain the stability of the apparatus during the lateral swinging movement of the boom extension, it is desirable to provide some means for transmitting a part of the stress to the tractor frame or axle. By way of exemplification, I have shown the mounting frame 11 equipped with side plates such as that shown at 87 in Figs. 2 and 3. Each such plate has a guide rod 88 and a spring seat 89. A bracket 90 fastened to the front axle 91 of the tractor provides another spring seat and a guide peg at 92. A compression spring at 93 is engaged at its upper end on rod 88 and against seat 89. At its lower end, it is seated on bracket 90 and engaged on peg 92. A similar device being used at each side of the loader frame, there is spring resistance to any tendency of the frame to tilt with respect to the tractor axle due to possible yielding of the tractor springs when the boom extension is swung to one side or the other.

Fig. 1 shows the boom extension swung over a truck at one side of the tractor equipped with a device embodying the invention. By using a rack and gear segment to effect the oscillation of the boom extension, I am able to swing the extension through a wide angular range of movement with a comparatively short stroke of the piston of the hydraulic operating ram.

Further guides for the movement of the parts are desirably provided by equipping the loader frame 11 with mounting plates 94, 95 for the attachment of arcuate arms 96. The boom base 25 has wear plates 96' in addition to the gussets 26 to bear against the arcuate arms 96, as clearly shown in Figs. 1 to 3.

The trencher, shown in Figs. 5 to 9, incorporates many of the same features above described, although it uses structure which is specifically different at a number of points. The loader frame 11, applicable to the tractor, may be the same as that above described. The boom base 250 is nearly identical to boom base 25, being pivoted to the mounting frame and guided with respect thereto in a manner very similar to that above described. At its end, the boom base 250 is centrally provided with a transverse member 350 on which the king pin 360 is mounted, the king pin 360 having its upper end braced by a box like bracket 370.

The boom extension 400 comprises a heavy pipe or tube to the anchored end of which there is welded or otherwise secured bearing sleeve 410 oscillatably mounted on king pin 360. The upper and lower surfaces of the boom extension 400 have wear plates 97, 98 confined between upper and lower bearing plates 99 and 100 respectively, as best shown in Figs. 5, 8 and 9. The extension may be provided with truss-like bracing 101, 102, 103, as best shown in Figs. 5 and 6. At its free end is pivoted a duplex lever 104 which pivotally supports the trenching bucket 105 for oscillatory movement between the position of Fig. 6 and that of Fig. 7. The bucket has additional pivotal movement with respect to lever 104 on the connecting pintle 106 subject to the control of ram 107 which is pivotally connected at 108 to the bucket and at 109 to the upper end of lever 104. Concurrent movement of the lever and bucket is effected by another ram 110, the cylinder of which is pivoted at 111 to the boom extension and the piston of which is pivoted at 112 to lever 104.

Lateral oscillation of the boom extension need not be as great in a tool of this character as in the tool previously described. Accordingly, the ram 810 which oscillates the boom extension is direct acting, instead of operating through a rack and segment. The ram's cylinder is pivoted at 115 to a bracket 116 on the base 250 of the boom. The piston of ram 810 is pivoted at 117 directly to the boom extension, as best shown in Figs. 5, 7 and 8.

As clearly shown in Fig. 5, the rams 110 and 107 are used to move the bucket 105 through an arc from the retracted position of Fig. 6 to the advanced position of Fig. 5. The depth of the bucket is controlled by the main elevating rams 28 which act on the boom base. As the bucket swings toward the operator, it excavates a trench, as shown at 120. The entire boom is then elevated, the boom extension is swung to the side and the bucket is tilted toward the position of Fig. 6 to dump its contents beside the trench.

Because the bucket operates toward the tractor in this type of trenching tool, it is convenient to brace the mounting frame directly from the earth instead of from the tractor axles through the use of the rams 125. The cylinders of these rams are fixed to the mounting frame, as shown in Fig. 5 in positions in which they diverge downwardly and are inclined forwardly and downwardly. Their respective pistons 126 have broad earth-engaging feet 127 whereby the extended rams transmit the load directly from the frame 11 to the earth and at the same time resist any tendency of the tractor to be drawn bodily forwardly as the bucket 105 excavates the earth.

When the trench excavation is complete and it is desired to re-fill the trench, the blade 130, interchangeable with bucket 105, is substituted therefor. The blade has arm means 131 pivoted on pintle 106 and it also has a pivotal connection for ram 107. To protect the lower end of ram 107 from the earth engaged by the blade, the blade is desirably provided with a shoe at 132 in which the lower end of the cylinder, and its pivotal connection with the blade, are housed.

From the many variations exemplified in the embodiments herein shown, it will be evident that it is possible to incorporate the present invention in a wide variety of structural forms. In all cases, however, there is a boom pivoted at or near the rear of a mounting frame attached to a tractor, the boom projecting forwardly where implements mounted thereon are in full view of the forwardly facing operator.

In all instances, the boom moves in its entirety in a substantially upright plane about its pivotal connection with the mounting frame. However, in all instances, there is an independently movable forward extension of the boom which is pivoted to the base portion thereof so that its free forward end may be swung by power from side to side. Any one of a wide variety of implements may be carried by the free forward end of such a boom. By way of exemplification, we have illustrated two different types of buckets for moving a pay load from in front of the tractor to a position at the side of the tractor, and we have also shown a device for moving the work back from the side of the tractor to a position at the front thereof.

While it is preferred that the axis about which the boom extension is oscillatable respecting the boom base shall extend in the same general direction as the axis or center line of the boom base, the precise angle between the parts is not critical, provided that it be sufficiently close to a right angle so that the implement at the free end of the swingable boom extension can be operated in immediate proximity to the tractor front wheels. At the same time, if the dirt is to be placed in a truck, the arrangement must be such as to permit the bodily movement of the boom in a vertical plane to elevate the implement high enough to clear a truck, as shown in Fig. 1. This is accomplished, in part, by the fact that the king pin or turntable which pivotally connects the two sections of the boom is desirably about midway of the overall length of the boom. The elongated base section is also pivoted at a fairly high level on the mounting frame. This enables the laterally swingable extension to be long enough to carry the work over a truck.

Other than as indicated in the appended claims, we are not concerned with details of construction of the boom base or the boom extension or the mounting frame or the means of operating the various movable parts. However, to the extent that portions of the apparatus are claimed in detail, they are important because particularly desirable to the successful achievement of our objects.

We claim:

1. A tractor attachment comprising the combination with mounting means providing a transverse fulcrum, of a boom pivoted to the fulcrum for bodily swinging movement from a lowered position of projection forwardly from said fulcrum to an elevated position of projection upwardly from said fulcrum and in a generally upright plane including the path of tractor movement, said boom comprising a base portion and a laterally swingable forward end portion in pivotal connection with the base portion and having its free end oscillatable upon its said pivot laterally of the path of tractor movement, said free end portion partaking of the upright swinging movement of the boom as a whole and being oscillatable laterally independently of the base portion, the pivotal connection of the laterally swingable forward end portion to the base portion of the boom including a pintle having its axis extending at substantially a right angle to the plane in which the boom extension is laterally swingable and outwardly from said fulcrum in the general direction in which the base portion of the boom extends, whereby the laterally swingable free end portion of the boom is disposed at an angle to the base portion to project downwardly from the base portion when the latter is in its lowered position and to project forwardly of the base portion when the latter is in its elevated position, in further combination with means including a ram having telescopically related parts respectively connected between the base portion and the forward end portion of the boom for effecting oscillatory movement of the forward end portion laterally with respect to the base portion, and a rack and pinion, the pinion being connected with the laterally swingable forward end portion of the boom and the rack being connected with one of the parts of said ram, the base portion of the boom being provided with guide means for the rack and with an anchor for the other part of the ram.

2. In a device of the character described, the combination with a tractor mount having boom fulcrum means with a transverse axis, a boom normally projecting forwardly from said means and bodily oscillatable vertically in a plane including the path of tractor movement, said boom including a base portion pivoted on said fulcrum means and a laterally swingable extension portion pivoted to the base portion for oscillation in a direction transverse respecting the path of tractor movement, the base portion and extension portion having a turntable connection comprising co-acting parts in pivotal connection and further being provided with bearing guide surfaces constraining said extension portion for movement in a plane which is fixed with respect to said base portion, one of said bearing guide members being extensive in a plane in which the other such surface has relative movement in the lateral swinging movement of the extension respecting the base portion of the boom, said surfaces being disposed radially remote from the axis about which such oscillation occurs and having interlocked portions constraining said extension to oscillation in said plane, an implement at the free end of said extension portion, the range of oscillation of the boom being from a lowered position in which said boom extension is inclined downwardly and forwardly to dispose said implement near ground level at the front of the tractor and the axis of turntable rotation is upwardly and forwardly inclined and at substantially a right angle to said boom extension to an elevated position in which said boom extension is substantially horizontal and the axis of turntable rotation is substantially vertical for lateral swinging movement of the boom extension and its implement in substantially a horizontal plane.

3. The device of claim 2 in which the boom extension is angularly related to the base portion of the boom.

4. The device of claim 3 in which the turntable is spaced from said fulcrum a substantial distance, said base portion of the boom comprising means for swinging the turntable bodily in an arc from a position over the front of the tractor in the lowered position of the boom to a position over the center of the tractor in the elevated position of the boom, said base portion of the boom having a terminal end of substantial dimension both transversely and vertically, the pivotal connection of the extension to the base portion including a pivot projecting in a generally forward direction from the normally upper side of the end of the base portion, the elongated guide surface aforesaid being disposed adjacent the normally lower side of the end of the boom base portion.

5. The device of claim 4 in further combination with a ram mounting bracket carried by the end of the boom base portion, a ram cylinder on the mounting bracket, and a ram piston telescopically reciprocable in the cylinder and having an operative driving connection with the boom extension at a point offset from its pivotal connection with the base portion of the boom whereby to exert a moment of oscillation on said extension for effecting transverse swinging movement thereof.

6. The device of claim 5 in which the connections of the ram cylinder and piston with the bracket and boom extension respectively comprise pintles accommodating relative pivotal movement.

7. In a device of the character described, the combination with a tractor mount having boom fulcrum means with a transverse axis, a boom normally projecting forwardly from said means and bodily oscillatable vertically in a plane including the path of tractor movement, said boom including a base portion pivoted on said fulcrum means and a laterally swingable extension portion pivoted to the base portion for oscillation in a direction transverse respecting the path of tractor movement, the base portion and extension portion having a turntable connection comprising coacting parts in pivotal connection and further being provided with bearing guide surfaces, one of which is extensive in a plane in which the other such surface has relative movement in the lateral swinging movement of the extension respecting the base portion of the boom, said surfaces being disposed radially remote from the axis about which such oscillation occurs and having interlocked portions constraining said extension to oscillation in said plane, an implement at the free end of said extension portion, the range of oscillation of the boom being from a lowered position in which said boom extension is inclined downwardly and forwardly to dispose said implement near ground level at the front of the tractor and the axis of turntable rotation is upwardly and forwardly inclined and at substantially a right angle to said boom extension to an elevated position in which said boom extension is substantially horizontal and the axis of turntable rotation is substantially vertical for lateral swinging movement of the boom extension and its implement in substantially a horizontal plane, the boom extension being angularly related to the base portion of the boom, the turntable being spaced from said fulcrum a substantial distance, said base portion of the boom comprising means for swinging the turntable bodily in an arc from a position over the front of the tractor in the lowered position of the boom to a position over the center of the tractor in the elevated position of the boom, said base portion of the boom having a terminal end of substantial dimension both transversely and vertically, the pivotal connection of the extension to the base portion including a pivot projecting in a generally forward direction from the normally upper side of the end of the base portion, the elongated guide surface aforesaid being disposed adjacent the normally lower side of the end of the boom base portion, in further combination with a ram mounting bracket carried by the end of the boom base portion, a ram cylinder on the mounting bracket, and a ram piston telescopically reciprocable in the cylinder and having an operative driving connection with the boom extension at a point offset from its pivotal connection with the base portion of the boom whereby to exert a moment of oscillation on said extension for effecting transverse swinging movement thereof, the motion-transmitting connection of the ram piston to the boom extension comprising a rack for which the boom base provides a guide-way and pinion teeth connected with the boom extension and meshing with the rack.

8. The device of claim 5 in which the boom extension is provided at its free end with means for effecting relative oscillation of the implement respecting the boom extension.

9. The device of claim 8 in which the implement comprises a bucket.

10. The device of claim 8 in which the implement comprises a bucket having an opening bordered by marginal teeth directed rearwardly toward the base portion of the boom.

11. The device of claim 10 in which said mounting for the boom further includes forwardly and laterally extending ground-engaging feet for resisting forward tractor movement during the rearward action of the bucket and for resisting lateral swinging movement of the mounting in the lateral swinging movement of the boom extension and bucket.

12. In a device of the character described, an elongated boom base section provided adjacent one end with a fixed fulcrum and adjacent its free end with a king pin, a boom extension section pivoted on the pin, said boom base section being pivotal about said fixed fulcrum through a substantial arc from a lowered position in which said king pin projects forwardly with said boom extension inclined to the horizontal and an elevated position in which said king pin projects upwardly for rotation of said boom extension about said pin in a substantially horizontal plane, means on the boom base section providing a guide surface remote from the pin and in a plane substantially at right angles thereto, the boom extension section having a complementary bearing surface guided on the bearing surface of the base section whereby said boom extension section is constrained to rotate in a plane defined by said bearing surfaces.

13. The device of claim 12 in which the bearing surface of the base section is arcuate and comprises a plate, the boom extension section having in spaced relation to its bearing surface a finger interlocked about the margin of the plate with the under surface thereof to hold the respective bearing surfaces of the respective boom sections in mutual engagement.

14. The device of claim 12 in which the bearing surface of the boom base section comprises a transversely elongated plate, the said boom base section being provided with a second transversely extending bearing plate spaced from the plate first mentioned and between which plates the boom extension section projects and is confined for lateral swinging movement only respecting the boom base section, the said sections participating in vertical swinging movement of the boom respecting said mounting.

15. The combination with a tractor mounting comprising a pair of side frames having cross connection and provided at opposite sides with boom elevating rams, of a boom including a rigid base section having upper side bars provided with pivotal connections to the side frames of said mounting, said pivotal connections being axially aligned with each other transversely of the mounting, rear bars projecting angularly from the side bars first mentioned and connected with the respective rams, lower side bars extending from the respective rams, and front members for the boom base section connecting the upper side bars first mentioned with each other and with the lower side bars aforesaid and connecting the lower side bars with each other, whereby to provide a base for a turntable structure at the outer end of the boom base section in a plane which is fixed with respect to the boom base section and is nearly at right angles to a radius drawn from the pivotal connection of such section with the mounting frame; a turntable on said base, pivoting means on the turntable at the end of the boom base section; and a boom extension section mounted on said pivotal means for lateral oscillation parallel to the plane of the turntable respecting the boom base section, said boom extension section having an implement at its free end and being bodily movable with the boom base section in an upright direction and independently movable laterally.

16. The device of claim 15 in which each side of the boom base section has approximately the form of a parallelogram in side elevation.

17. The device of claim 15 in which the respective boom sections have bearing surfaces remote from the king pin and means interlockingly engaging said surfaces to accommodate lateral swinging movement of the extension respecting the base section, said bearing surfaces and interlocking means comprising means for constraining the extension against any other movement respecting the base section.

18. A tractor attachment comprising the combination with a tractor attachment mounting frame having a substantially horizontal transverse fulcrum, of a boom pivoted to the fulcrum and extending forwardly therefrom for bodily swinging movement in a vertical plane from a lowered position of projection forwardly of the tractor to an elevated position of projection above the tractor, said boom comprising a base portion having a pivot fixed at the end thereof and mounting means for said pivot on which it is substantially vertical when the boom base portion is elevated and is disposed at a forward angle when the boom base portion is lowered, a laterally swingable boom forward end portion oscillatable upon said pivot and disposed at a fixed oblique angle in said plane with respect to the boom base portion, and an implement mounted at the end of said boom end portion, said boom end portion having a downward and forward inclination to dispose said implement near the ground when the boom base portion is lowered and being substantially horizontal when the boom base portion is elevated for lateral swinging movement of said implement in substantially a horizontal plane.

19. The device of claim 18 in which said tractor has an axle, said frame having a bracing connection to said axle for resisting displacement of said frame in the course of lateral swinging movement of the boom forward end portion and implement.

20. The device of claim 19 in which said bracing connection comprises springs at opposite sides of the longitudinal centerline of the tractor.

References Cited in the file of this patent

UNITED STATES PATENTS

| | | |
|---|---|---|
| D. 162,873 | Pilch | Apr. 10, 1951 |
| 2,366,558 | Rauch | Jan. 2, 1945 |
| 2,391,857 | Arps et al. | Jan. 1, 1946 |
| 2,411,498 | Billings | Nov. 26, 1946 |
| 2,599,991 | Hegre | June 10, 1952 |
| 2,622,749 | Stuhr | Dec. 23, 1952 |
| 2,646,182 | Maas | July 21, 1953 |
| 2,660,816 | Maxwell | Dec. 1, 1953 |
| 2,674,500 | Hukari | Apr. 6, 1954 |
| 2,717,091 | Smith | Sept. 6, 1955 |
| 2,742,165 | Pilch | Apr. 17, 1956 |

FOREIGN PATENTS

| | | |
|---|---|---|
| 143,756 | Australia | Oct. 10, 1951 |